(12) United States Patent
Cleary

(10) Patent No.: US 11,065,089 B2
(45) Date of Patent: Jul. 20, 2021

(54) AESTHETIC ORTHODONTIC LIGATURE

(71) Applicant: 3M INNOVATIVE PROPERTIES COMPANY, St. Paul, MN (US)

(72) Inventor: James D. Cleary, Glendora, CA (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 205 days.

(21) Appl. No.: 15/765,503

(22) PCT Filed: Dec. 13, 2016

(86) PCT No.: PCT/US2016/066270
§ 371 (c)(1),
(2) Date: Apr. 3, 2018

(87) PCT Pub. No.: WO2017/116677
PCT Pub. Date: Jul. 6, 2017

(65) Prior Publication Data
US 2019/0069976 A1    Mar. 7, 2019

Related U.S. Application Data

(60) Provisional application No. 62/272,426, filed on Dec. 29, 2015.

(51) Int. Cl.
*A61C 7/30* (2006.01)
*A61C 7/28* (2006.01)

(52) U.S. Cl.
CPC . *A61C 7/30* (2013.01); *A61C 7/28* (2013.01)

(58) Field of Classification Search
CPC .................................. A61C 7/30; A61C 7/28

USPC .......................................................... 433/10
See application file for complete search history.

(56) References Cited

U.S. PATENT DOCUMENTS

| | | | |
|---|---|---|---|
| 4,413,380 A * | 11/1983 | Suzuki | F16L 3/2334 24/16 PB |
| 4,536,154 A | 8/1985 | Garton, Jr. | |
| 4,867,679 A | 9/1989 | Rackley | |
| 5,078,596 A | 1/1992 | Carberry | |
| 5,183,301 A * | 2/1993 | Lundberg, Jr. | B65D 63/1063 292/318 |
| 5,254,002 A | 10/1993 | Reher | |
| 5,613,853 A * | 3/1997 | Chasan | A61C 5/007 433/215 |
| 5,931,668 A | 8/1999 | Birkel | |
| 6,050,998 A * | 4/2000 | Fletcher | A61B 17/688 606/103 |
| 6,309,214 B2 | 10/2001 | Birkel | |
| 6,648,638 B2 | 11/2003 | Castro | |

(Continued)

FOREIGN PATENT DOCUMENTS

JP    2006-167275    6/2006

OTHER PUBLICATIONS

International Search report for PCT International Application No. PCT/US2016/066270 dated Mar. 13, 2017, 4 pages.

*Primary Examiner* — Matthew M Nelson
(74) *Attorney, Agent, or Firm* — 3M IPC

(57) ABSTRACT

An aesthetic, stain resistant ligature with material properties suited for prolonged maintenance of sliding mechanics. The orthodontic ligatures of the present disclosure offer a practitioner the ability to tailor the level of tension applied by the ligature without fear of disengagement or deterioration over time.

18 Claims, 6 Drawing Sheets

(56) References Cited

U.S. PATENT DOCUMENTS

| | | |
|---|---|---|
| 6,746,243 B1 | 6/2004 | Holzhauer |
| 8,231,626 B2 * | 7/2012 | Hulliger ............... A61B 17/842 |
| | | 606/74 |
| 2001/0002309 A1 * | 5/2001 | Birkel ...................... A61C 7/28 |
| | | 433/15 |
| 2006/0008761 A1 | 1/2006 | Allred |
| 2006/0105179 A1 | 5/2006 | Hofman |
| 2008/0138757 A1 | 6/2008 | Lai |
| 2008/0224485 A1 | 9/2008 | Mangone |
| 2010/0285418 A1 | 11/2010 | Trimmer |
| 2011/0313431 A1 * | 12/2011 | Shimko ............. A61B 17/0401 |
| | | 606/139 |

* cited by examiner

AESTHETIC ORTHODONTIC LIGATURE

CROSS REFERENCE TO RELATED APPLICATIONS

This application is a national stage filing under 35 U.S.C. 371 of PCT/US2016/066270, filed Dec. 13, 2016, which claims the benefit of U.S. Provisional Application No. 62/272,426, filed Dec. 29, 2015, the disclosures of which are incorporated by reference in their entireties herein.

BACKGROUND

Orthodontic appliances are devices used in the professional supervision, guidance and correction of a patient's malpositioned teeth. The many benefits of orthodontic treatment include the attaining and maintaining of a proper bite function, enhancement of facial aesthetics, and easier maintenance of dental hygiene. Orthodontic appliances are placed in mechanical engagement with the patient's teeth and apply gentle mechanical forces that gradually move the teeth toward corrected positions to achieve a proper bite (or occlusion).

A very common type of orthodontic treatment uses tiny slotted appliances called orthodontic brackets, which are adhesively attached to either the front or back surfaces of the patient's teeth. To move the teeth within an upper or lower arch, a resilient arch-shape wire ("archwire") is mechanically engaged, or "ligated," into the slot of each bracket. The ends of the archwire are generally captured in appliances called molar tubes, which are bonded to the patient's molar teeth. As the archwire slowly returns to its original shape, it acts as a track that guides the movement of teeth toward their desired positions. The brackets, tubes, and archwire are collectively known as "braces."

Conventional brackets are ligated to the archwire with the help of opposing tiewings, which are cleat-like projections on the bracket body. After the archwire is placed in the archwire slot, either a tiny elastomeric "O"-ring ligature or a metal ligature wire is looped over the archwire and beneath the undercut portions of tiewings located on opposite sides of the archwire slot. By tightly encircling the undercut portions of the tiewings, the ligature (or ligature wire) can secure the archwire within the archwire slot of each bracket, while still allowing the archwire to slide longitudinally along the slot. Depending on the relative sizes and shapes of the archwire and the slot, it is possible to achieve a precise mechanical coupling between the two bodies. This enables the practitioner to control the position and orientation of each individual tooth in the arch.

Both of the ligating mechanisms above have certain drawbacks. For example, the frictional contact between O-ring ligatures and the archwire can increase resistance to archwire sliding within the slot. Moreover, the elastic properties of these ligatures can degrade over time, resulting in unpredictable sliding mechanics. While these ligatures can be made from translucent polymers for aesthetic treatment, these same ligatures also tend to stain in the presence of dark-colored foods and liquids. Ligature wire poses its own problems, since the process of tying and trimming the wire can be cumbersome and time-consuming for the orthodontic professional. Being made of metal, ligature wire is also considered non-aesthetic.

SUMMARY OF THE INVENTION

The present disclosure provides an aesthetic, stain resistant ligature with material properties suited for prolonged maintenance of sliding mechanics. The stain resistant ligatures can advantageously be made from nonelastomeric thermoplastics, which can provide ease or manufacture and particularly desirable aesthetic properties when used with certain ceramic brackets (e.g., CLARITY ADVANCED ceramic brackets, from 3M Company). The orthodontic ligatures of the present disclosure can be drawn about an archwire and bracket with ease, and offer the practitioner an ability to tailor the level of tension without fear of disengagement or deterioration over time. Moreover, the ligatures of the present disclosure may be advantageously fabricated as a monolithic unit, saving assembly and material cost.

In one aspect, the present disclosure provides a method of ligating an orthodontic bracket. The method includes the step of providing an orthodontic ligature with an elongated rib having a longitudinal axis, the rib comprising a stem portion and a coupling portion extending from the stem portion to a distal end. The ligature further includes a latching head extending from the stem portion and defining a passage, the passage including one or more deflectable structures projecting into the passage, with the stem portion including a certain cross-sectional geometry. The coupling portion of the rib includes a plurality of spaced apart features having a modified cross-sectional geometry relative to the stem portion. The method further includes providing an orthodontic appliance having a base for bonding to tooth structure and a body extending outwardly from the base, the body including an archwire slot extending across the body. The method then proceeds to positioning the rib proximate the archwire slot and drawing the distal end through the passage such that at least one feature engages a deflectable structure in the passage.

In another aspect, the present disclosure provides an orthodontic ligature comprising an elongated rib having a longitudinal axis, the rib comprising a stem portion and a coupling portion extending from the stem portion to a distal end. The ligature further includes a latching head extending from the stem portion and defining a passage, the passage including one or more deflectable structures projecting into the passage. The stem portion includes a certain cross-sectional geometry and the coupling portion includes a plurality of spaced apart sections having a modified cross-sectional geometry relative to the stem portion, the plurality of spaced apart features adapted to matingly engage with the deflectable structures in the passage to inhibit removal from the passage in certain directions when the coupling portion is received in the passage.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list

While the above-identified figures set forth several embodiments of the disclosure other embodiments are also contemplated, as noted in the description. In all cases, this disclosure presents the invention by way of representation and not limitation. It should be understood that numerous other modifications and embodiments can be devised by those skilled in the art, which fall within the scope and spirit of the principles of the invention.

Directional Definitions

As used herein:

"Mesial" means in a direction toward the center of the patient's curved dental arch.

"Distal" means in a direction away from the center of the patient's curved dental arch.

"Occlusal" means in a direction toward the outer tips of the patient's teeth.

"Gingival" means in a direction toward the patient's gums or gingiva.

"Facial" means in a direction toward the patient's lips or cheeks.

"Lingual" means in a direction toward the patient's tongue.

DETAILED DESCRIPTION OF ILLUSTRATIVE EMBODIMENTS

Figure 1:
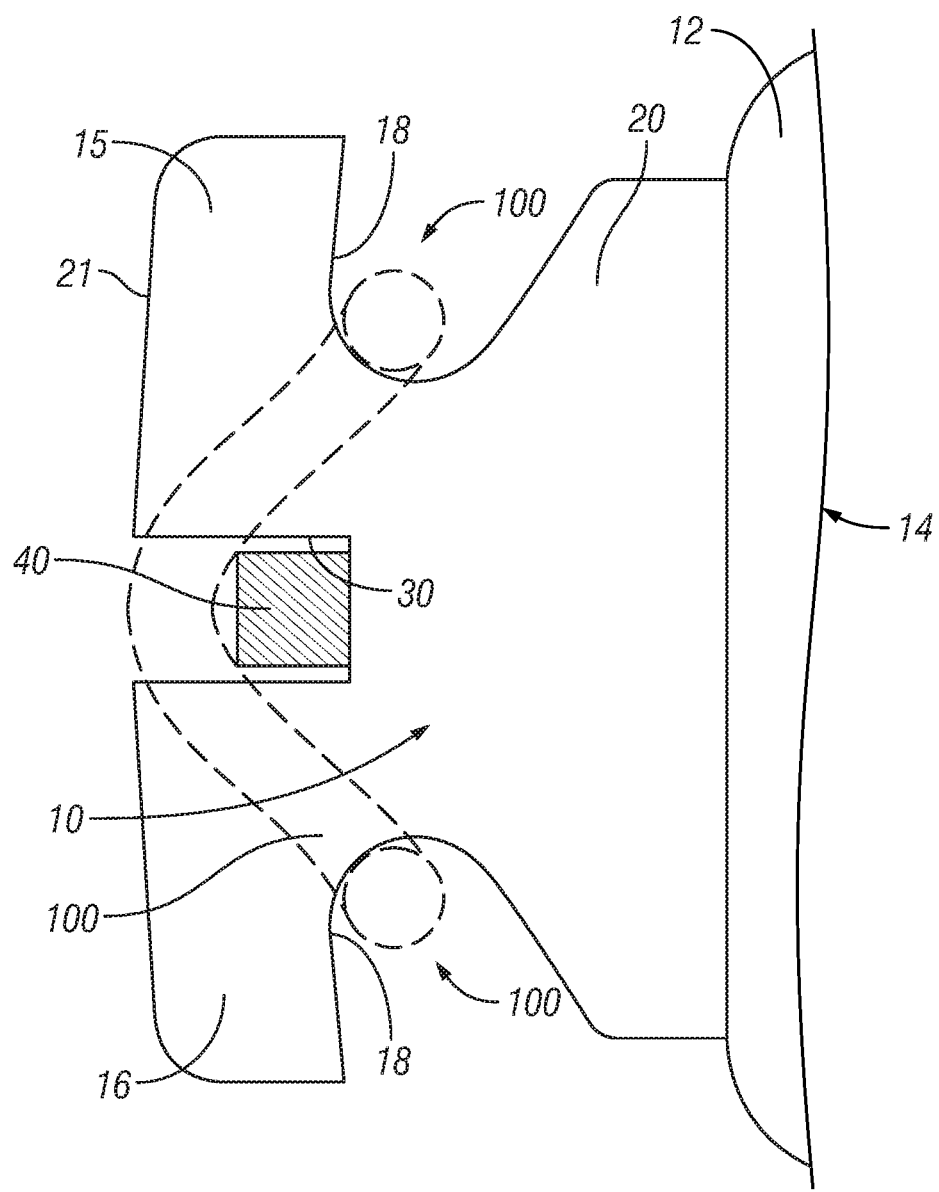
FIG. 1 is a perspective view of an orthodontic bracket including a ligated archwire according to one embodiment of the present disclosure.

An orthodontic appliance in the form of bracket 10 according to one embodiment is shown in FIG. 1. The bracket 10 has a base 12 having an outer surface 14 adapted for adhesive bonding to a patient's tooth. Typically, the outer surface 14 is concave and substantially conforms to the convex outer surface of the tooth. In certain embodiments, the outer surface 14 may feature a compound contour, with curvature in both the mesial-distal and occlusal-gingival direction.

A body 20 extends outwardly from the base 12 in a facial direction, away from the outer surface 14. Optionally and as shown, the base 12 and body 20 are integral components. In certain embodiments, the base 12 and body 20 may be integrally made, for example, via machine or mold from a polymeric material as disclosed in U.S. Pat. No. 4,536,154 (Garton, et al.), a ceramic material such as a fine-grained polycrystalline alumina as disclosed in U.S. Pat. No. 6,648,638 (Castro, et al.), or a polymer-ceramic composite such as glass-fiber reinforced polymeric composites as disclosed in U.S. Pat. No. 5,078,596 (Carberry, et al.) and U.S. Pat. No. 5,254,002 (Reher, et al.). Other suitable materials include, for example, metallic materials (such as stainless steel, titanium, and cobalt-chromium alloys) and plastic materials (such as fiber-reinforced polycarbonate).

The body 20 has a facial surface 21 and an elongated archwire slot 30 extending in a generally mesial-distal direction across the facial surface 21 of the body 20. An archwire 40 is received in the archwire slot 30 and typically has a generally rectangular cross-section that substantially corresponds with the dimensions of walls of the archwire slot 30. A close correspondence between the dimensions of the archwire and the archwire slot can provide for a precise coupling between the archwire and bracket 10, giving the treating practitioner a high degree of control over the movement of teeth. However, other archwire geometries can be used that do not closely approximate the dimensions of the lingual and gingival walls.

The bracket 10 includes occlusal tiewings 15, gingival tiewings 16, and undercuts 18. A treating professional can elect to manually ligate an archwire with the assistance of the undercuts 18 and tiewings 15, 16. Ligation can be achieved, for example, by securing an orthodontic ligature 100 beneath the undercuts 18, over an archwire received in the slot 30, and beneath the tiewings 15, 16. Thus, ligature 100 functions to secure an archwire positioned in the slot 30 in engagement with the bracket 10.

Figure 2:
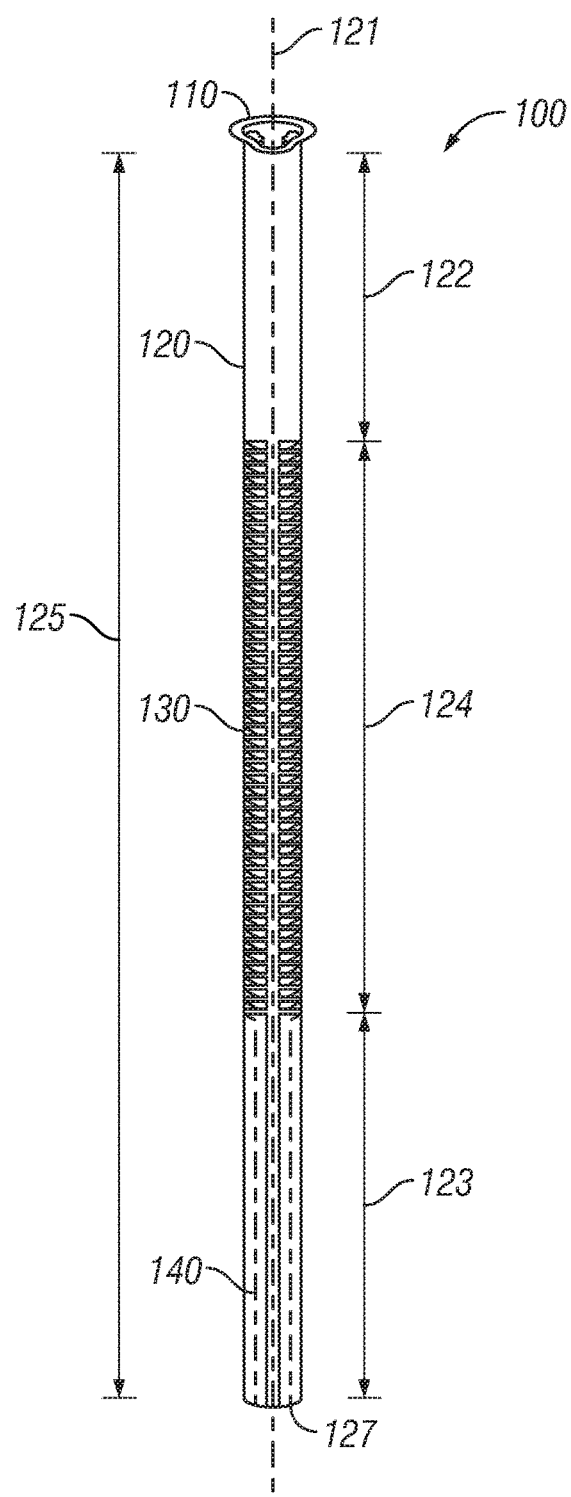
FIG. 2 is a top view of an orthodontic ligature according to one embodiment of the present disclosure.
Figure 3:
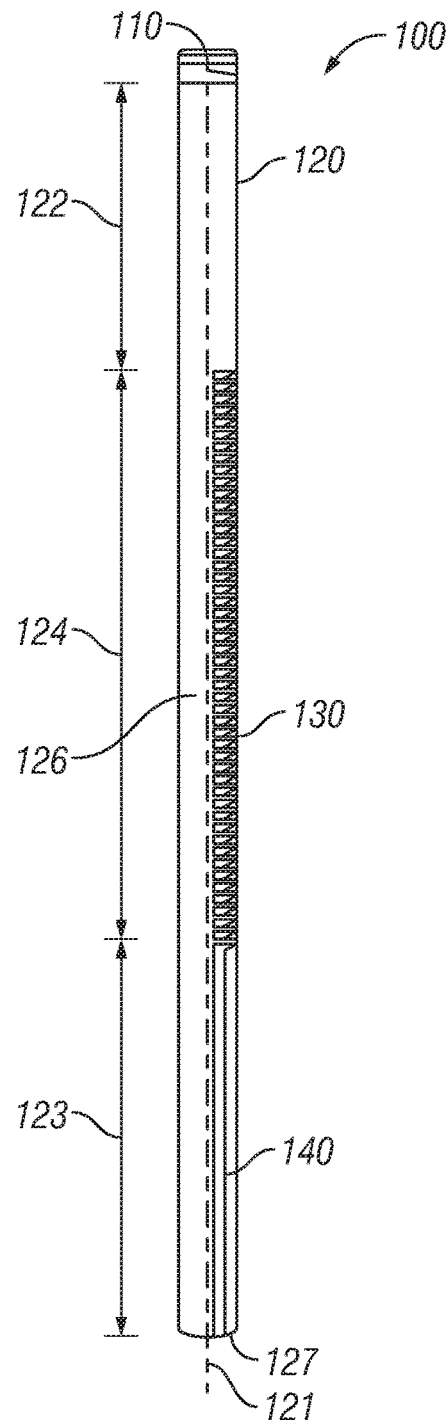
FIG. 3 is a side view of the orthodontic ligature of FIG. 2.

An orthodontic ligature 100 of the present disclosure is depicted in FIGS. 2-3. The ligature 100 includes a latching head 110 and an elongate rib 120. The rib 120 includes a stem region 122 proximate the head 110 and a coupling segment 124. The rib 120 includes a longitudinal axis 121 extending from the distal end 127 of tip region 123 through the region of the stem 122 directly adjacent the latching head 110. The rib 120 in the depicted embodiment includes a generally consistent largest cross-sectional dimension (e.g., diameter) along its length 125 and includes a tapered region near the distal end 127. In other embodiments, the rib may include a general taper from the latching head to tip, from coupling portion to tip, or any other desired region. Further, the rib may include a first generally consistent largest cross sectional dimension through the stem 122, and a second, different largest cross-sectional dimension through the coupling segment (which may or may not be generally consistent). In presently preferred circumstances, the largest cross-sectional dimension of the rib in the stem 122 is 0.051 to 0.076 cm (0.020 to 0.030 in).

The rib 120 includes a generally circular cross-sectional geometry in at least the stem 122, such that the largest cross-sectional dimension represents a diameter. In other embodiments, the rib 120 at stem 122 may include an ovular, square, rectangular, or other cross-sectional geometry. The coupling segment 124 includes spaced apart features 130 defining a modified cross-sectional geometry relative to stem 122. In the depicted embodiment, the largest cross-sectional dimension is substantially the same through the stem 122 and the coupling segment 124, and an underside region 126 of the coupling segment retains the arcuate outer surface of the stem 122.

Figure 4:
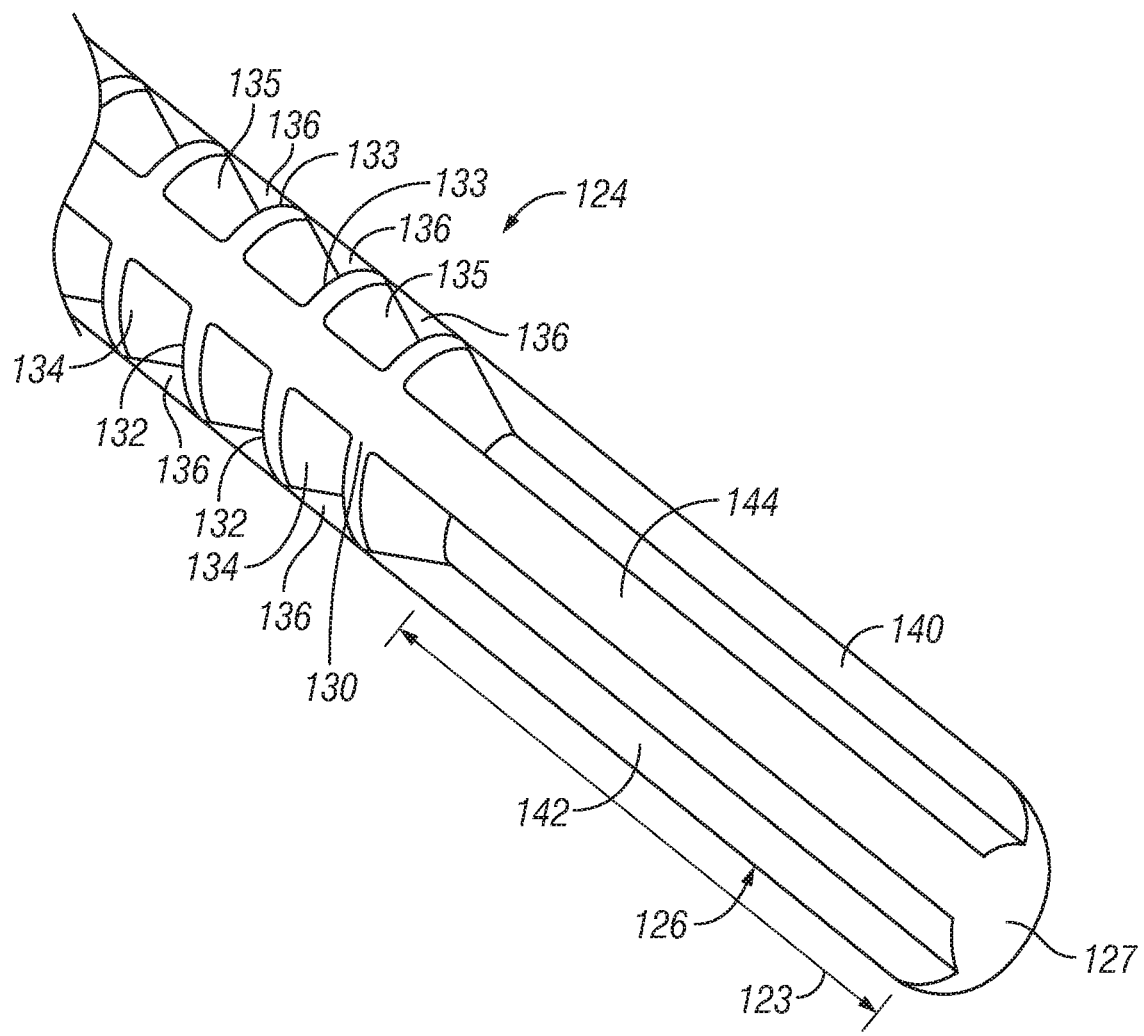
FIG. 4 is a perspective view of a coupling segment of the orthodontic ligature of FIGS. 2 and 3.
Figure 5:
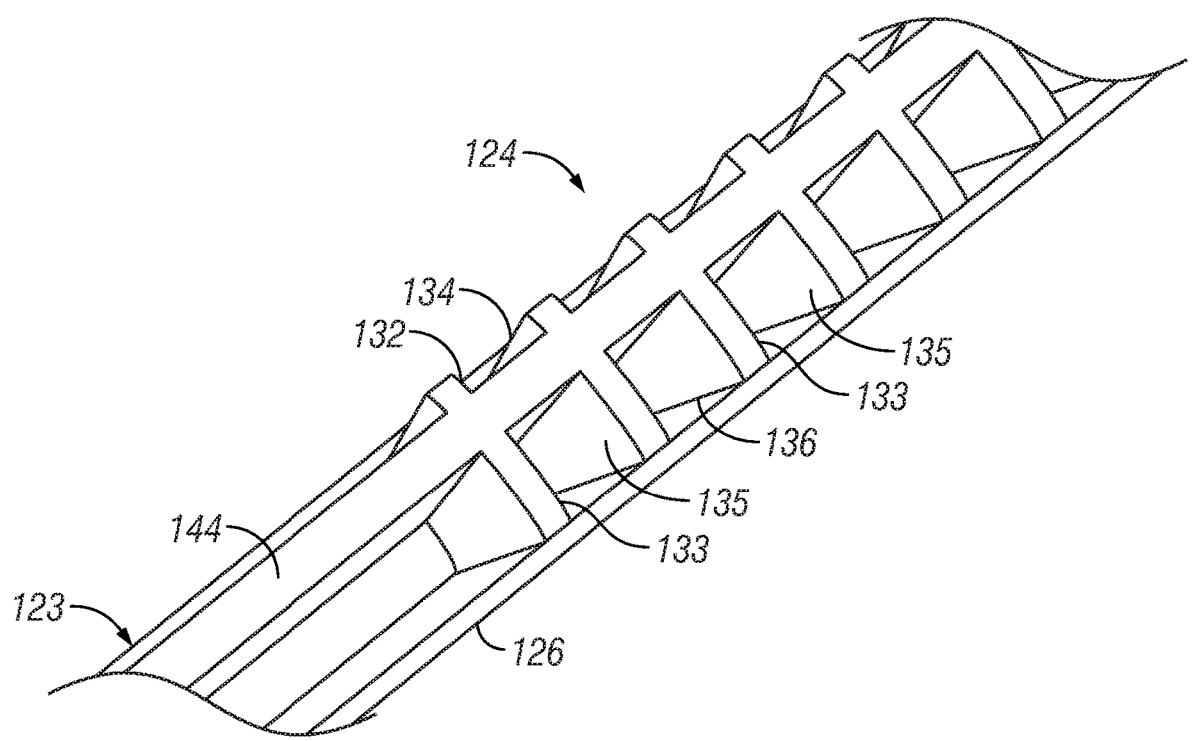
FIG. 5 is another perspective view of a coupling segment of the orthodontic ligature of FIGS. 2-4.
Figure 6:
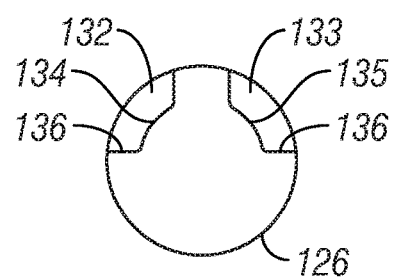
FIG. 6 is an end view of the orthodontic ligature of FIGS. 2-5.

Turning to FIGS. 4-6, the coupling segment 124 and tip region 123 are shown more detail. The coupling segment 124 includes a number of spaced apart engagement features 130 disposed along the length of the coupling segment 124. The engagement features 130 represent intrusive features in the rib 120. Intrusive features can generally be described as features having surface points that lie below the average outer surface of the rib 120, particularly in the stem 122. In alternative embodiments, the engagement features can be protrusive features, in that they represent features having surface points that lie above the average outer surface of the rib 120, particularly in the stem 122. In the depicted embodiment, each engagement feature 130 includes locking surfaces 132, 133 and tapered wall sections 134, 135. Each locking surface 132, 133 is substantially planar and faces in a direction away from the tip 123, such that each planar locking surface 132, 133 faces the stem 122. Each locking surface 132, 133 engages with features in latching head 110, as described below, to limit travel of coupling segment 124 in certain directions when drawn through the latching head 110 by a practitioner.

The tapered wall sections 134, 135 are recessed relative to the surface of the rib 120, and particularly stem 122. As depicted, the tapered wall sections 134, 135 are angled with the base of tapered wall disposed adjacent a locking surface 132. The taper angle of the wall section will depend on the distance between the spaced apart engagement features, particularly adjacent locking surfaces 132. In a particularly suitable embodiment, the spacing between adjacent locking surfaces is 0.030 cm (0.012 in) and the taper angle is about 25 degrees. Other configurations are possible, and can depend on, among other considerations, the length of the rib 120, the length of the coupling segment 124, and the desired number of tensioning positions provided by the ligature 100.

Each of the depicted wall sections 134, 135 presents an exterior geometry of a partial frustrum, such that the outer surface of the rib 120 within the engagement feature 130 is curvilinear and convex. A curvilinear, convex surface can, in certain implementations, assist in deflecting features in the latching head 110. In other implementations, one or both wall sections 134, 135 can be generally planar. Each engagement feature 130 further includes planar surfaces 136 adjacent the base of the tapered wall section 134 or 135. In certain implementations, the planar surfaces 136 can also assist in positioning the coupling segment 124 within latching head 110 as the coupling segment 124 is drawn therethrough.

The tip region 123 includes a plurality of channels 140, 142 extending from the distal end of the tip to the first tapered wall section adjacent the tip region 123. The channels 140, 142 create a central rail 144 in the tip region leading to the engagement features 130 in the coupling segment. The central rail 144 as shown is generally coplanar with the outer arc or the stem portion 122, but may be relatively protrusive or intrusive in other implementations. The channels 140, 142 are dimensioned to glide over the deflectable features 116 (See FIGS. 7 and 8) in the latching head 110 as the tip region 123 is drawn through the passage, ensuring that movement of the tip region 123 in the passage 114 is not substantially impeded.

Figure 7:
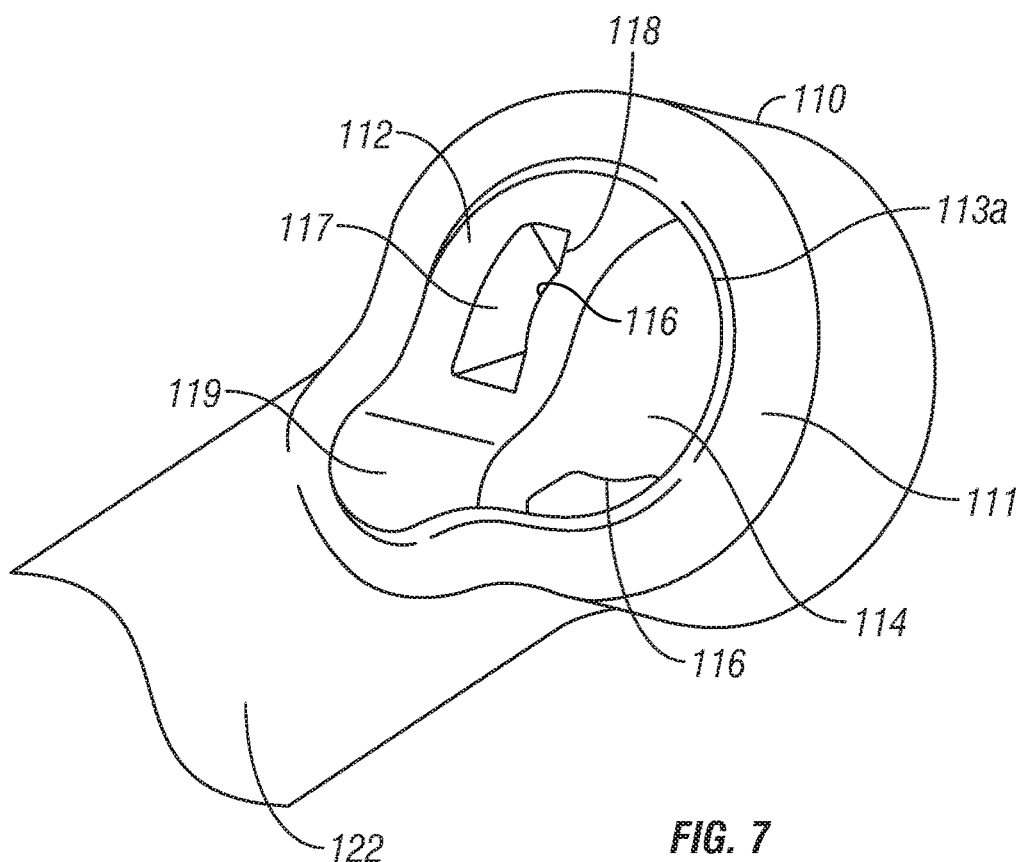
FIG. 7 is a perspective view of a latching head of the orthodontic ligature of FIGS. 2 and 3.
Figure 8:
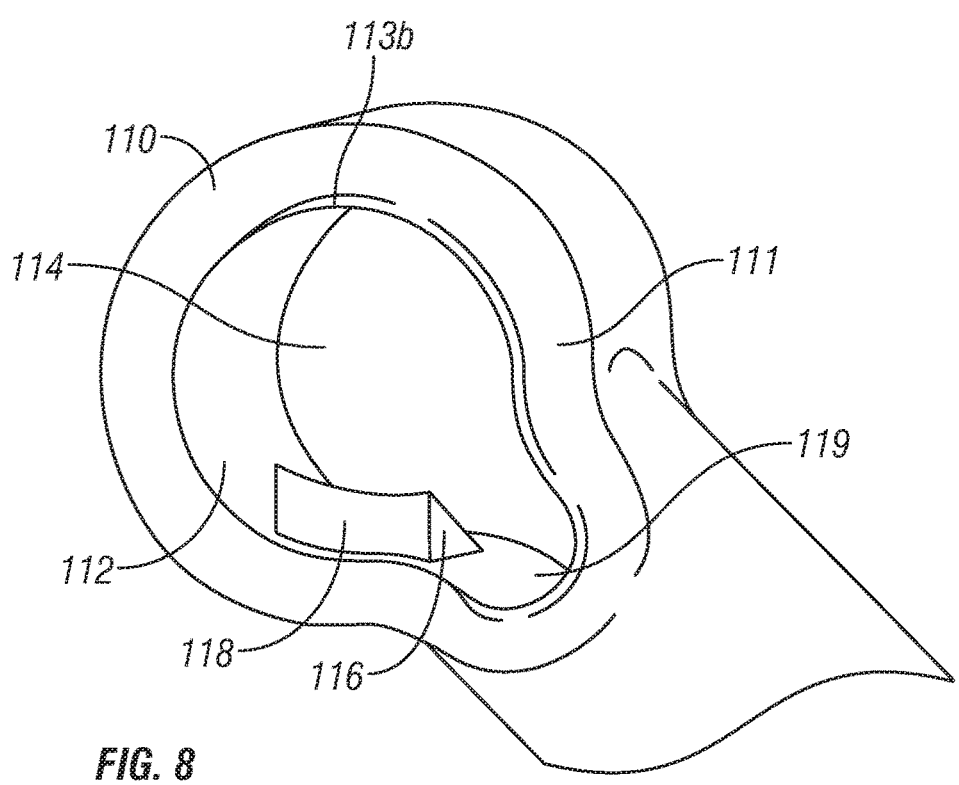
FIG. 8 is another perspective view of the latching head of the orthodontic ligature of FIGS. 2 and 3.

As depicted in FIGS. 7 and 8, the latching head 110 includes an annular ring 111 with interior walls surfaces 112 defining a pair of openings 113a, 113b and a passage 114. The interior wall surfaces 112 include a plurality of deflectable structures 116 projecting into the passage 114, and an optional recess 119 for receipt of any protrusive portions of the rib 120 (e.g., rail 144). The passage 114 includes a longitudinal axis that is generally perpendicular to the longitudinal axis 121 of the rib 120, and includes a cross sectional geometry complementary to the cross-sectional geometry of the coupling segment 124. It can be advantageous to include a passage 114 oriented perpendicular to the rib, as the orientation can separately or in combination improve the ease of fabrication of the ligature and enhance the engagement between the latching head 110 and rib 120 when the ligature is disposed about an orthodontic bracket.

Each deflectable structure 116 includes at least one ramp 117. The ramp 117 includes a generally concave surface extending at an angle relative to the inner wall surface 112, creating a tapered surface increasing in the direction of the center of passage 114 (i.e., away from the opening 113a). The taper angle of ramp 117 is typically selected such that it is substantially similar (i.e., a difference of no greater 5 degrees) to the taper angle of each tapered wall section 134. The concavity of the ramp 117 is similarly dimensioned to cooperatively engage the convexity of each tapered wall section. In a particularly suitable embodiment the taper angle of the ramp 117 is about 25 degrees.

While the passage 114 is depicted having two deflectable structures 116, an orthodontic ligature can rely on one deflectable structure to engage the coupling segment. Alternatively, the latching head 110 can feature more than two deflectable structures 116, with the coupling segment featuring a corresponding number of spaced engagement features 130. The deflectable structure 116 features a planar locking surface 118 opposite ramp 117, the planar locking surface 118 oriented generally perpendicular to the inner wall surface 112. The locking surface 118 can feature an orientation relative to the inner wall surface 112 selected such that it is substantially similar (i.e., a difference of no greater 5 degrees) to the orientation of locking surfaces 132, 133 on the rib 120. A deflectable structure according to the present disclosure may include other configurations and surface geometries, but is typically complementary with the geometry of the engagement features on coupling segment.

Figure 10:
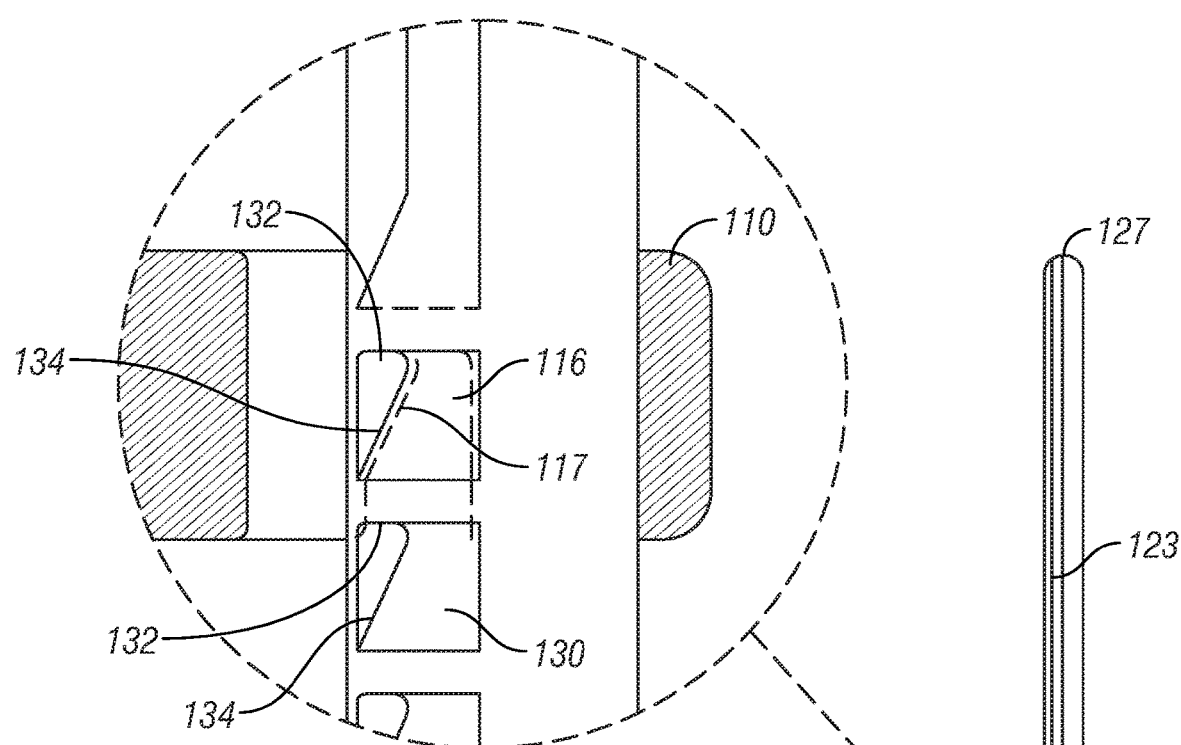
FIG. 10 is an expanded view of certain features on the coupling segment engaging deflectable features in the latching head.
Figure 9:
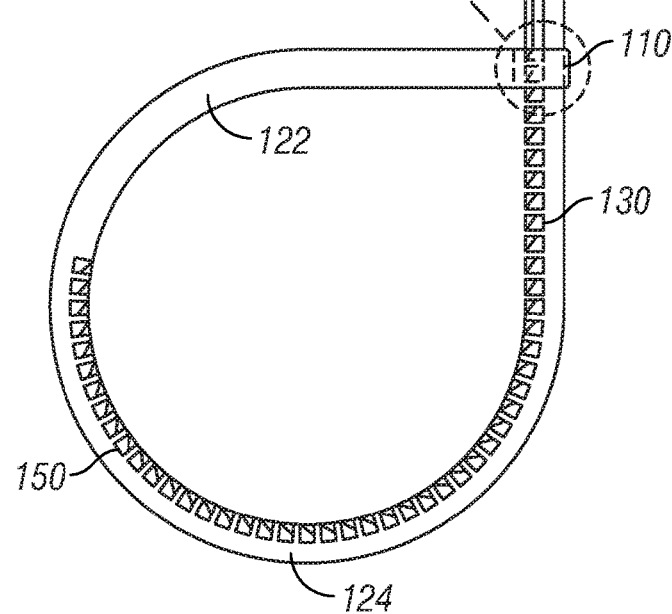
FIG. 9 is a side view of the orthodontic ligature of FIGS. 2-8, with a coupling segment drawn through a latching head.

As shown in FIGS. 9 and 10, the passage 114 functions to receive the coupling segment 124 and the engagement features 130, while inhibiting reverse movement of the tip region 123 by engagement of the flat locking surface on the coupling segment 124 with a side (typically planar locking surface 118) of deflectable structure 116 (See FIG. 10). Since the angle of the ramp 117 is complementary to a corresponding tapered wall section of the coupling segment 124, a deliberate force pulling the coupling segment 124 in the direction of the tip region 123 will cause the deflectable structure 116 to deflect away from the engagement feature. The deflection, either by the deflectable structure 116 itself or the inner wall 112 from which it projects, allows the respective tapered wall section to traverse the deflectable structure 116 and the coupling segment to proceed to the locking surface 132 of the next engagement feature. In this manner the ligature 100 may be drawn tight at a variety of selected positions, but cannot be readily disengaged without further practitioner intervention.

To ligate an orthodontic appliance, the tip region 123 of the ligature 100 is inserted through the passage 114 of the latching head 110, thereby forming a loop 150. Referring to FIG. 1, the loop is positioned (either before or as a result of the prior step) in at least one of the undercuts 18 on one side of the orthodontic bracket 10, passing over the top of the archwire 40 and into the undercut 18 on the opposite slot of the bracket 10. Both the insertion of the tip region and the placement may be accomplished by a suitable hand instrument, one that can engage the components of the ligature 100 without irreversible deformation. Pulling of the coupling segment 124 through the passage 114 continues until sufficient tension has been established in the ligature 40 to accomplish the requisite orthodontic function as determined by the practitioner.

After the required amount of tension has been established in the ligature 100 by drawing the coupling segment 124 through the passage 114, the portion of the ligature 100 extending beyond the passage 114 can be removed utilizing cutters, etc., whereupon the ligature 40 remains in place and functions to secure the archwire 40 in the archwire slot 30. Once desired by the practitioner, the ligature 100 can be removed by cutting a portion thereof.

The orthodontic ligatures of the present disclosure are typically formed from nonelastomeric thermoplastic polymers. As used in connection with the present disclosure, "thermoplastic" (and variations thereof) means a polymer or polymeric composition that softens when exposed to heat and returns to its original condition or near its original condition when cooled to room temperature. As used in connection with the present disclosure, "nonelastomeric" means that the material will not substantially resume its original shape after being stretched. Accordingly, a nonelastomeric thermoplastic polymer is one that softens or melts and returns to its original condition or near its original condition upon cooling and which does not exhibit elastomeric properties at ambient conditions (e.g., room temperature and pressure).

Some exemplary of nonelastomeric thermoplastic compositions that may be used in connection with the present disclosure include, but are not limited to, polyurethanes, polyolefins (e.g., polypropylenes, polyethylenes, etc.), polystyrenes, polycarbonates, polyesters, polymethacrylates, ethylene vinyl acetate copolymers, ethylene vinyl alcohol copolymers, polyvinylchlorides, acrylate modified ethylene vinyl acetate polymers, ethylene acrylic acid copolymers, nylons, fluoropolymers, and combinations thereof. Examples of fluoropolymers include homopolymers such as polyvinylidene difluoride (PVDF), copolymers such as polyvinylidene fluoride-trifluoroethylene P(VDF-TrFE), polyvinylidene fluoride-chlorofluoroethylene P(VDF-CFE), polyvinylidene fluoride-hexafluoropropylene P(VDF-HFP), polyvinylidene fluoride-trifluoroethylene-chlorofluoroethylene P(VDF-TrFE-CFE), polyvinylidene fluoride-trifluoroethylene-chlorotrifluoroethylene P(VDF-TrFE-CTFE), polyvinylidene fluoride-tetrafluoroethylene-chlorotrifluoroethylene, polyvinylidene fluoride-trifluoroethylene-hexafluoropropylene, polyvinylidene fluoride-tetrafluoroethylene-hexafluoropropylene, polyvinylidene fluoride-trifluoroethylene-tetrafluoroethylene, polyvinylidene fluoride-tetrafluoroethylene, polyvinylidene fluoride-trifluoroethylene-vinyl fluoride, polyvinylidene fluoride-tetrafluoroethylene-vinyl fluoride, polyvinylidene fluoride-trifluoroethylene-perfluoro(methyl vinyl ether), polyvinylidene fluoride-tetrafluoroethylene-perfluoro(methyl vinyl ether), polyvinylidene fluoride-trifluoroethylene-bromotrifluoroethylene, polyvinylidene fluoride-tetrafluoroethylene-bromotrifluoroethylene, polyvinylidene fluoride-tetrafluoroethylene-chlorofluoroethylene, polyvinylidene fluoride-trifluoroethylene-vinylidene chloride, and polyvinylidene fluoride-tetrafluoroethylene-vinylidene chloride and combinations thereof.

In presently preferred circumstances, the nonelastomeric thermoplastic used to form the orthodontic ligature is a polypropylene. In presently preferred implementations, the orthodontic ligature undergoes reduced or minimal plastic deformation under forces typically used to draw the coupling segment through the passage. Plastic deformation, over time, can inhibit the deflectable structure in the passage from matingly engaging each successive engagement feature on the coupling segment. In implementations featuring a nonelastomeric thermoplastic, the mating features of the coupling segment and the latching head maintain acceptable mechanical interaction by avoiding irreversible deformation. Instead, one or both of the latching head and the deflectable features is able to flex or otherwise temporarily self-move out of the path of travel of the coupling segment as it is drawn through the passage.

The nonelastomeric thermoplastic compositions used in connection with the present disclosure can also be combined with various additives for desired effect. These include, for example, fillers, viscosity reducing agents, plasticizers, tackifiers, colorants (e.g., dyes or pigments), antioxidants, antistatic agents, bonding aids, antiblocking agents, slip agents, stabilizers (e.g., thermal and ultraviolet), foaming agents, microspheres, glass bubbles, reinforcing fibers (e.g., microfibers), internal release agents, thermally conductive particles, electrically conductive particles, and the like. The amounts of such materials that can be useful in the thermoplastic compositions can be readily determined by those skilled in the art of processing and using such materials.

The components of the orthodontic ligature are preferably monolithically formed in one piece from the same material. Orthodontic ligatures of the present disclosure can be fabricated using traditional machining techniques such as microinjection molding and computerized numerically controlled (CNC) machining, or precision injection molding, as can be understood by persons skilled in the art. Other alternatives processes for forming orthodontic ligatures include, but are not limited to, thermoforming, vacuum forming, pressure forming, plug-assist forming, reverse-draw thermoforming, matched die forming, extrusion, and casting. In other embodiments, the latching head may be formed separately from the rib and the two components fastened together by conventional methods.

In alternative embodiments, the engagement features can be formed in the surface of the rib by a variety of methods, including a variety of microreplication methods. A number of techniques known to those skilled in the art, selected depending in part upon the tool material and features of the desired topography. Illustrative techniques include, but are not limited to, etching (e.g., chemical etching, mechanical etching, or other ablative means such as laser ablation, electron beam, or reactive ion etching, etc., and combinations thereof), photolithography, stereolithography, micromachining, knurling (e.g., cutting knurling or acid enhanced knurling), scoring, cutting, etc., or combinations thereof.

All of the patents and patent applications mentioned above are hereby expressly incorporated by reference. The embodiments described above are illustrative of the present invention and other constructions are also possible. Accordingly, the present invention should not be deemed limited to the embodiments described in detail above and shown in the accompanying drawings, but instead only by a fair scope of the claims that follow along with their equivalents.

The invention claimed is:

1. An orthodontic ligature for ligating an archwire to an orthodontic bracket, the ligature comprising:
    an elongated rib having a first longitudinal axis, the rib comprising a stem portion including a certain cross-sectional geometry and a coupling portion extending from the stem portion to a distal end, wherein the coupling portion includes a tip region with a pair of opposing elongated channels disposed on either side of a central rail; and
    a latching head extending from the stem portion and defining a passage, the passage including one or more deflectable structures projecting into the passage and a second longitudinal axis that is perpendicular to the first longitudinal axis, each deflectable structure of the one or more deflectable structures received in one of the channels as the distal end is drawn through the passage,
    wherein the coupling portion includes a plurality of spaced apart engagement features having a modified cross-sectional geometry relative to the stem portion, the plurality of spaced apart engagement features adapted to matingly engage with the deflectable structures in the passage to inhibit removal from the passage in certain directions when the coupling portion is received in the passage,
    wherein the plurality of engagement features each include a first and a second flat locking surface facing in a direction towards the latching head and a first and a second tapered wall surface having an at least partially frustoconical configuration, wherein the first and second tapered wall surfaces are directly opposed on either side of the central rail.

2. The orthodontic ligature of claim 1, wherein the at least the rib comprises a non-elastomeric material.

3. The orthodontic ligature of claim 2, wherein the ligature comprises polypropolyene, a nonelastomeric fluoropolymer, or combinations thereof.

4. The orthodontic ligature of claim 1, wherein the ligature is molded as a single component.

5. The orthodontic ligature of claim 1, wherein the stem portion includes a circular cross-sectional geometry, and wherein the cross-sectional diameter is substantially constant throughout the stem portion.

6. The orthodontic ligature of claim 5, wherein the plurality of spaced apart features include a reduced cross-sectional dimension relative to the cross-sectional dimension of the stem portion.

7. The orthodontic ligature of claim 1, wherein at least one of the first and second tapered wall surfaces is curvilinear and convex.

8. The orthodontic ligature of claim 1, wherein the tapered wall surface increases in height in a direction towards the latching head and away from the flat locking surface.

9. The orthodontic ligature of claim 1, wherein the coupling segment includes an underside region lacking engagement features.

10. The orthodontic ligature of claim 1, wherein the first longitudinal axis extends from the distal end through a region of the stem directly adjacent the latching head.

11. The orthodontic ligature of claim 1, wherein each deflectable structure of the one or more deflectable structures includes a tapered surface increasing in the direction of the center of the passage.

12. The orthodontic ligature of claim 11, wherein the tapered surface deforms as the coupling portion is drawn through the passage.

13. The orthodontic ligature of claim 1 wherein the plurality of space apart engagement features are intrusive relative to the central rail.

14. The orthodontic ligature of claim 1, wherein each feature of the plurality of spaced apart features includes a planar surface adjacent the base of the wall section.

15. A method of ligating an orthodontic bracket, the method comprising:
    Providing the orthodontic ligature of claim 1;
    providing an orthodontic appliance having a base for bonding to tooth structure and a body extending outwardly from the base, the body including an archwire slot extending across the body;
    positioning the rib proximate the archwire slot; and
    drawing the distal end through the passage such that at least one feature engages a deflectable structure in the passage.

16. The method of claim 15, and wherein drawing the distal end through the recess comprises positioning a locking surface of one of plurality of features adjacent the deflectable structure in the passage.

17. The method of claim 16, wherein the tapering surface deflects the deflectable structure as the coupling portion is drawn through the passage.

18. The method of claim 16, wherein the rib cannot be pulled in the direction opposite the distal end once the locking surface is engaged with a deflectable structure in the passage.

* * * * *